Oct. 27, 1964 R. KAULEN 3,154,415

PROCESS FOR PRODUCING INTAGLIO PRINTING PLATES
OR CYLINDERS FOR PHOTOGRAVURE PRINTING

Filed Jan. 14, 1958

INVENTOR

Robert Kaulen

BY

Lowry & Rinehart

ATTYS.

United States Patent Office 3,154,415
Patented Oct. 27, 1964

3,154,415
PROCESS FOR PRODUCING INTAGLIO PRINTING PLATES OR CYLINDERS FOR PHOTOGRAVURE PRINTING

Robert Kaulen, Lovenich, near Cologne, Germany
Filed Jan. 14, 1958, Ser. No. 708,808
4 Claims. (Cl. 96—37)

Figure 1:
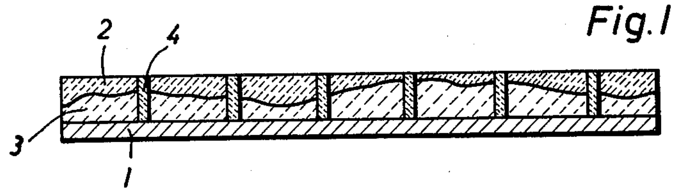

This invention relates to the art of photogravure printing and has special reference to an improved process for producing intaglio printing plates or cylinders, and is a continuation-in-part of the application filed by Robert Kaulen on October 12, 1953, Serial No. 385,609.

One important object of the invention is to simplify the method of producing such plates.

Another important object of the invention is to provide a novel method of producing such plates which method will reduce the number of steps heretofore used while, at the same time, will produce a highly effective plate.

A further object of the invention is to provide a novel method for the production of such plates wherein a sensitized film, such as gelatine or other water soluble colloid, may be used.

A process for the photomechanical manufacture of printing forms for intaglio printing by means of a doctor is known by U.S. Patent 2,159,588, the various details of which are hereby incorporated by reference. The process disclosed in this patent comprises covering a metallic body used as the basis for the printing form with a light sensitive chromatized colloid layer composed mainly of gelatin sensitized with a potassium bichromate solution, exposing the same twice, under a diapositive of a continuous unscreened half-tone image and under a photogravure screen in any succession, the one after the other. While the thickness of the layer may be considerably varied, as a rule the usual thickness which has been used in the art for many years is satisfactory, i.e., a thickness which on the average is about 6- to 7-thousandths of a millimeter. Then the metallic body covered with an undeveloped twice exposed colloid layer will be treated with water. The duration of exposure is on an average 6 to 8 minutes, but may be more or less depending upon factors well understood by those skilled in the art. The water treatment is for the purpose of merely causing the colloid layer to swell as far as the unexposed copied layer is concerned. The colloid layer may consist of marketable gelatine. Thereby is obtained those parts of the gelatine layer which are unexposed or exposed to a lesser degree and which have been caused to swell by water treatment may be more readily permeated by the etching means than the more or less hardened parts, even if only normal etching means are used as, for instance, solutions of perchloride of iron without addition of an acid. For this reason, the treatment with water carried out at a certain temperature and during a certain length of time has been restricted to the swelling of the layer. By such a method an immediate deposit of the reglets upon the copper plate may no doubt be obtained, but that part of the colloid layer hardened by exposure does not come in immediate contact with the copper plate. By causing the part of the colloid layer which remained unhardened to swell, merely provides for a better penetration of the etching means.

This invention refers to a further improvement of the process mentioned before. It has been found that when the colloidal layer will be subjected to an intense treatment with water the unexposed colloid layer, which is enclosed by the exposed colloid layer and by the screen lines, may be washed out completely. Accordingly, the exposed parts of the colloidal layer sink down for direct deposit on the metallic body. This is a surprising statement.

Figure 2:
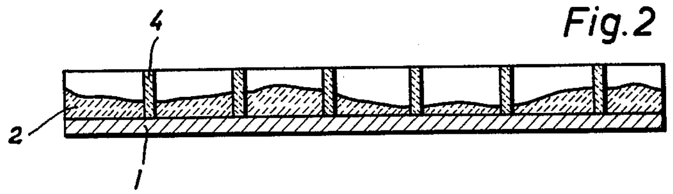

In the accompanying drawing like characters of reference indicate like parts in the several views, and in which:

FIG. 1 is a sectional diagrammatic view of a known step in the preparation of a printing form for intaglio printing, and FIG. 2 is a view similar to FIG. 1 but showing a step of the present method according to the invention.

As illustrated in the drawing, there is shown a plate 1 of copper or other suitable metal. In FIG. 1 there is shown a sensitized film which has been assembled on the plate 1 and when in position may be exposed in the usual manner to light passing through a positive (continuous tone) and a photogravure screen. By this exposure, hardened screen lines or stiffeners 4 are embedded in the film. As is usual, the photosensitive content of the film is chemically changed in part and is rendered insoluble. The portion of the film thus rendered insoluble is indicated at 2 and will vary in depth as the positive through which the light passes during the exposure of the film varies in density. The portion 3 of the film is not chemically changed. Hitherto the layer comprising the portions 2 and 3 has been etched in the manufacture of printing forms for intaglio printing. According to the new steps of the invention the assembled plate and exposed film are treated to a current of water to such extent that the soluble portion 3 will not only swell but be washed away, thereby allowing the insoluble portion 2 to sink down into close contact with the plate 1. When a current of water is applied long enough, it has been found that the soluble portion 3 gradually diffuses through the hardened insoluble layer 2. The force of the current of water simultaneously settles layer 2 towards and finally against the metal surface 1 between adjacent screen lines 4, as the soluble portion is washed away.

The etching agent is now applied and will act on the plate 1 in accordance with the variation and thickness of the water insoluble deposit 2. By reason of the close contact of the water insoluble portion 2 of the film with the plate, the action of the etching fluid is rendered more accurate in the variation in the depth to which the plate is etched.

In detail, the following procedure is followed:

A metal underlayer which is preferably a copper underlayer is coated with a chromatized gelatine layer. Thereafter, the plate or the like is exposed in the copying frame or in the copying machine so as to expose the screen and the diapositive independently from one another. After exposure, i.e., after copying of the continuous-tone image and the screen one after the other, a treatment with water of about room temperature is carried out. The water may also be slightly heated. The temperature to be used for the water treatment is dependent upon the quality of the gelatine used and may be ascertained by a preliminary test. Generally, when using the commercial gelatine of the trade as, for example, edible gelatine, a water temperature of about 35° C. should not be exceeded.

The water treatment is now performed for a certain period of time. This treatment may be carried out simply by immersing the plate or printing cylinder bearing the exposed layer, in a water bath and turning or moving same to and fro. The duration of the water treatment is dependent upon the type of the gelatine and the copy, about 15 minutes being generally sufficient. For controlling the water treatment, the bath used is dyed. Such a dying bath may consist, for example, of 1,000 cc. of water, 20 to 30 grams of water-soluble aniline dye, as for example, methyl violet, and if desired 40 to 50 grams of alum. The dyeing permits the process of washing out the unexposed gelatine parts to be controlled since during the final treatment with water the dye is washed out or away from those places where the gelatine is left unhardened or relatively little hardened. The darkness of tone values of the tanned layer is determined by the duration of the aforesaid treatment and/or by the concentration of the dye in the water bath. The tone values may, as the water treatment proceeds, be exactly differentiated as soon as the unexposed parts of the layer are dissolved, i.e., diffused. After the optimum of contrasting has been reached, which requires about 15 minutes, the plate is removed from the bath and rinsed with water. For this purpose, the copy should be subjected to extensive water treatment, but it remains dyed.

After having ascertained in this manner that the unexposed colloidal layer has been fully washed out with the hardened colloidal layer having been deposited on the metal underlayer, the etching may be started. The fact that the gelatine layer, which has not been hardened by the light, has diffused through the hardened layer can be demonstrated in practice by the fact that a relief is present. This relief is recognizable through a magnifying glass as well as by the sound which is heard, for example, when drawing a sharpened pencil across the developed and dried copy.

The etching step is performed in conventional manner, a preferred etching solution being a ferric chloride solution of about 36 to 44° Bé. After completion of the etching step, the printing form is freed from the hardened copying layer left on the form, for instance, with the aid of caustic alkalis or weak sulfuric acid, or the like. Thereafter, the printing form is repolished as usual and will then be ready for the printing process in the machine.

The advantages of the new process especially reside in the fact that in the intaglio copper plate printing process in which pigment is not used, the etching solution has to penetrate only the hardened colloid parts between the screen lines. Thus, the result of the otherwise much more elaborate pigment paper process is obtained without having to put up with the disadvantages inherent in this known process.

The effect obtained according to the invention may be explained in that the gelatine of that part of the colloid layer which is not tanned by the exposure to light is removed by the long and intensive treatment with water that means that those particles which exert the colloidal effect are diluted or have such a poor concentration that the colloid layer unexposed to light is disintegrated. That part of the layer diluted in such a manner may now diffuse through the tanned colloid layer at those places which are tanned to a lesser extent. The dissolved gelatine finds creeping ways between the tanned colloid layer 2 and the screen lines 4. It is also explained thereby that the tanned layer 2 which is supported in itself by tanning may sink down along the sides of the screen lines to the metallic surface and displaces during sinking down the dissolved gelatine.

What is claimed is:

1. In a process for producing intaglio printing plates and cylinders for photogravure printing with the aid of a doctor, by exposing under a diapositive of a continuous-tone original and under a photogravure screen, independently one after the other, a light sensitized colloidal layer coated directly on an underlying metal surface to produce hardened screen lines extending downwardly through said colloidal layer into contact with said metal surface, and thereafter etching said metal surface, the improvement comprising subjecting said colloidal layer, after transfer of the picture and screen by said exposure, while said colloidal layer remains on said underlying metal surface, to prolong treatment with water for a time sufficient to dissolve and fully wash out the unhardened parts of said colloidal layer, which are present below the hardened surface parts and separated by hardened screen lines contacting the surface of the metal, and to cause substantially the entire exposed parts of the colloidal layer to sink down and uniformly and directly deposit on said metal surface.

2. In a process for producing intaglio printing plates and cylinders for photogravure printing with the aid of a doctor, by exposing under a diapositive of a continuous-tone original and under a photogravure screen, independently one after the other, a light sensitized colloidal layer coated directly on an underlying metal surface to produce hardened screen lines extending downwardly through said colloidal layer into contact with said metal surface, and thereafter etching said metal surface, the improvement comprising subjecting said colloidal layer, after transfer of the picture and screen by said exposure, while said colloidal layer remains on said underlying metal surface, to prolong treatment with flowing water at a temperature approximating and not exceeding 35° C. and with sufficient flow pressure and for a time sufficient to dissolve and fully wash out the unhardened parts of the colloidal layer, which are present below the hardened surface parts and separated by hardened screen lines contacting the surface of the metal, and to cause substantially the entire exposed parts of the colloidal layer to sink down and uniformly and directly deposit on said metal surface.

3. In a process for producing intaglio printing plates and cylinders for photogravure printing with the aid of a doctor, by exposing under a diapositive of a continuous-tone original and under a photogravure screen, independently one after the other, a light sensitized colloidal layer coated directly on an underlying metal surface to produce hardened screen lines extending downwardly through said colloidal layer into contact with said metal surface, and thereafter etching said metal surface, the improvement comprising subjecting said colloidal layer, after transfer of the picture and screen by said exposure, while said colloidal layer remains on said underlying metal surface, to treatment with water for a period of approximately 15 minutes to dissolve and fully wash out the unhardened parts of said colloidal layer, which are present below the hardened surface parts and separated by hardened screen lines contacting the surface of the metal and to cause substantially the entire exposed parts of the colloidal layer to sink down and uniformly and directly depoist on said metal surface.

4. In a process for producing intaglio printing plates and cylinders for photogravure printing with the aid of a doctor, by exposing under a diapositive of a continuous-tone original and under a photogravure screen, independently one after the other, a light sensitized colloidal layer coated directly on an underlying metal surface to produce hardened screen lines extending downwardly through said colloidal layer into contact with said metal surface, and thereafter etching said metal surface, the improvement comprising subjecting said colloidal layer, after transfer of the picture and screen by said exposure, while said colloidal layer remains on said underlying metal surface, to a flow of water at a temperature ranging from room temperature to 35° C. for a period of approximately 15 minutes, to dissolve and fully wash out the unhardened parts of said colloidal layer, which are present below the hardened surface parts and separated by hardened screen lines contacting the surface of the metal and to cause substantially the entire exposed parts of the colloidal layer to sink down and uniformly and directly deposit on said metal surface.

References Cited in the file of this patent

UNITED STATES PATENTS 2,195,588 Gorig ---------------- May 23, 1939

FOREIGN PATENTS 128,819 Australia -------------- Aug. 19, 1948

OTHER REFERENCES

Friedman: "History of Color Photography," pp. 432–433, American Photographic Publishing Co., Boston.